UNITED STATES PATENT OFFICE.

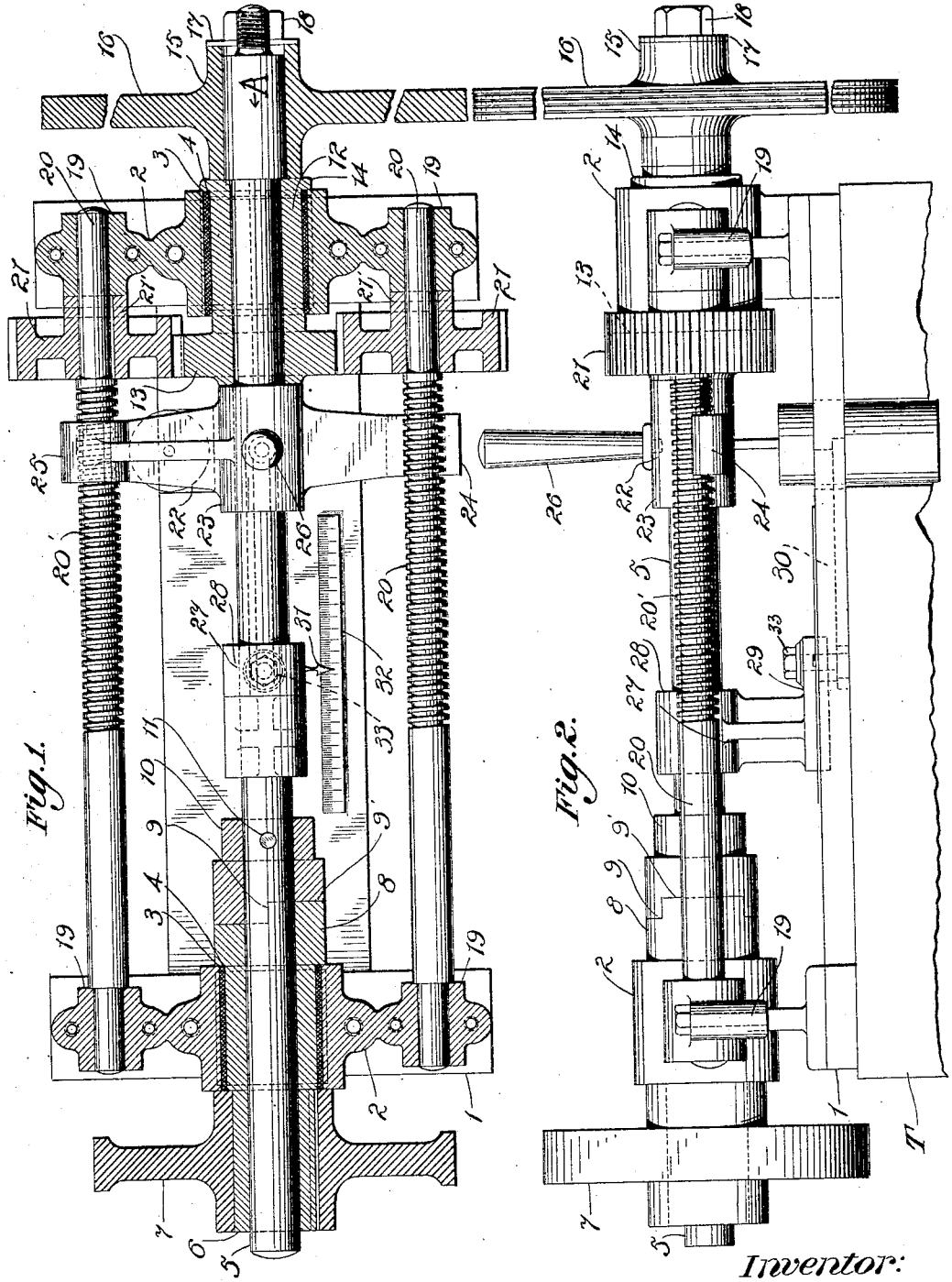

FERDINAND FRANCIS BRUCKER, OF AKRON, OHIO, ASSIGNOR TO MILLER RUBBER CO., OF AKRON, OHIO, A CORPORATION OF OHIO.

WIRE-WINDING MACHINE.

1,184,619.   Specification of Letters Patent.   Patented May 23, 1916.

Application filed September 11, 1915. Serial No. 50,132.

*To all whom it may concern:*

Be it known that I, FERDINAND F. BRUCKER, a citizen of the United States, residing at Akron, Ohio, in the county of Summit and State of Ohio, have invented certain new and useful Improvements in Wire-Winding Machines, of which the following is a specification.

The present invention relates to wire winding apparatus and is intended more particularly for the purpose of winding insulated wire onto a ring former to be later incorporated in tire beads for pneumatic tires.

The object of the present invention is to provide a machine upon which insulated wire may be wound, the machine being so constructed that any given number of revolutions of wire can be wound upon a circular former, after which the machine will automatically stop.

A further object of the invention is to provide an indicator associated with stop mechanism whereby the exact amount of wire or number of coils fed onto the ring former can be automatically controlled.

With these and other objects in view, the invention consists in the combination and arrangement of parts more fully described in the following specification, illustrated in the accompanying drawings and pointed out in the appended claims.

In the drawings, Figure 1 is a sectional plan view of the machine. Fig. 2 is a side elevation of the same.

Referring now to the drawings the machine is provided with a base plate 1 adapted to rest upon a table T to which it is securely fastened by bolts, clamps or similar means. Two brackets 2—2 are provided, one at each end of the base plate 1. These brackets are provided with centrally located bores 3, 3 containing bushings 4, 4. Extending longitudinally of the machine is a main shaft 5 provided at one end with a loosely mounted sleeve 6 having a bearing in the bushing 4 and provided at its outer end with a driving pulley 7 keyed thereto. The sleeve 6 which extends through the bushing 4 is provided at its inner end with an enlarged portion 8, the end of which is formed with clutch teeth 9. A collar 10 provided with correspondingly formed clutch teeth 9' is pinned to the shaft 5 as indicated at 11 and forms the other half of the clutch adapted to coöperate with the end of sleeve 8.

A sleeve 13 is bolted to the shaft 5 and has its bearing in the bushing 4 of the bracket 2 at the right hand end of the machine. This sleeve 12 is provided at its inner end with a gear 13 and at its outer end with a small shoulder 14 adapted to engage with the housing or bracket 2 at its outer face. Beyond the sleeve 12 the hub 15 of the form wheel 16 is keyed on the end of the shaft 5, being held in place by the cap plate 17 and nut 18 at the extreme outer end of shaft 5.

Each of the brackets 2, 2 is provided with small brackets 19 formed integral therewith and extending at right angles therefrom. These brackets 19 are centrally perforated to form bearings for the ends of two parallel shafts 20 which are loosely journaled therein. The shafts 20 are disposed parallel to one another and are also parallel to the main shaft 5, being supported in their brackets in the same horizontal plane as the main shaft 5. At the right hand ends of the shafts 20 gear wheels 21 are provided, the hubs of the gear wheels 21 being keyed to the shafts 20 and are provided with sleeves 21' extending some little distance to the right beyond the width of the faces of the wheels and adapted to contact against the inner face of the brackets 19.

As previously stated the sleeve 12, keyed to the shaft 5, is provided at its inner end with a gear wheel 13, the teeth of which are adapted to mesh with the gear wheels 21 located on either side. The faces of the gear wheels 21 are slightly wider than the face of the gear wheel 13. The difference between the width of the faces of the gear wheels 21 and the gear wheel 13 corresponds exactly to the distance which the shaft 5 is adapted to slide in its bearings, as will be hereinafter described. The shafts 20 are provided with worm threads 20' extending from the inner hubs of the gear wheels 21, along the shafts for any desirable distance.

A yoke 22 comprising a central hub or sleeve 23 and two oppositely disposed arms 24 and 25 respectively, is slidably carried on the shaft 5. The outer ends of the arms 24, 25 are formed as half nuts and are provided with threads adapted to engage the threads of the worms 20' on the shafts 20. The positions of the half nuts on the arms 24 and 25 are reversed, that is the end of the arm 24 is adapted to engage the underside of the worm shaft on one side of the machine, whereas the end of the arm 25 is adapted to engage the upper side of the worm shaft 20 on the opposite side of the machine. An operating handle 26 is attached to the central hub 23 of the yoke member 22 by means of which the yoke can be slightly tilted so as to disengage the arms 24 and 25 from the respective worm shafts 20 to slide the yoke along the shaft 5. An adjustable sliding standard or bracket 27 is provided. At the upper end of the bracket 27 a sleeve 28 is formed adapted to slide loosely on the shaft 5. The lower part of the bracket 27 is provided with a base plate 29 having slot and groove connection with a longitudinal groove 30 formed in the base plate 1 of the machine. Extending from the base plate 29 of the slidable bracket a pointer or arrow 31 is provided, adapted to register with an index scale 32 permanently secured to the base plate 1. An adjustable clamping nut 33 serves to retain the bracket 27 in any desired position along its path of movement.

By referring to the drawings and the above description, it will be seen that the main shaft 5 has a slight longitudinal displacement within its bearings. The sleeve 6 having the hub of the driving pulley 7 keyed thereto is insured against any longitudinal displacement in the bushing 4 by the hub 7 and the shoulder of the sleeve 8 which engage respectively the opposite sides of the opening 3 in the bracket 2. At the right hand side of the machine the sleeve 12 which is bolted to the shaft 5 is provided with the shoulder 14 at its right end abutting against the outer surface of the housing or bracket 2. The sleeve 12 however extends along the shaft 5 for some distance so that there is a space, (when the parts are as shown in the position indicated in Fig. 1) between the inner surface of the bracket 2 and the face of the gear wheel 13, formed integral with the sleeve 12. This space is equivalent in length to the difference between the width of the faces of the gear wheels 21 and the gear wheel 13 and is also equal to the depth of the teeth of the two clutch members 8 and 10. It will also be noted that the shaft 5 is shown in Fig. 1 extending at the left hand end a slight distance beyond the end of the sleeve 6.

The operation of the machine is as follows: If it is desired to form a ring core comprising six strands of insulated wire the sliding bracket 27 is adjusted along its groove until the pointer 31 is opposite the index member six places from the right hand end of the scale 32. In this position the bracket 27 is clamped securely by means of the adjustment screw 33. The operator, then by means of the handle 26, slides the yoke 22 along the shaft 5 to the left until the left end of the hub 23 is in contact with the barrel or sleeve 28 of the bracket 27. By grasping the former wheel 16 and pressing it in the direction indicated by the arrow A the shaft 5 is displaced in a direction to the left. The driving pulley 7 is constantly rotating and hence the left hand half of the clutch 8 of the sleeve 6 is also in constant rotation. This longitudinal displacement of the shaft 5 causes the half of the clutch 9 to engage with the half 8 and starts the shaft 5 rotating with the sleeve 6 and driving pulley 7. Rotation of the shaft 5 causes the gear wheel 13 to drive the two gear wheels 21, thus turning the shafts 20 each in the same direction and causing the yoke 22 to slide or creep gradually along the shaft 5 in a direction to the right. The measurements and relation of the parts are so arranged that just before six coils of wire have been wound upon the form wheel 16, the right hand end of the hub 23 of the yoke 22 will contact with the inner face of the hub of gear wheel 13 and bearing against it will displace it gradually to the right carrying with it, necessarily, the shaft 5 to which the wheel 13 is bolted. This movement will be so timed that just as the sixth revolution of the wheel 16 has been completed the sleeve 12 will have been completely pushed to the right in its bushing 4 and at the same time the teeth of the clutch half 9 will have become disengaged from the teeth of the other half of the clutch 8 and hence all of the mechanism at the right hand part of the machine will automatically stop.

The size of the form wheel 16 may be varied according to the size of the bead which it is desired to make. Any number of revolutions of wire can be wound upon the form wheel 16, simply by setting the adjustable stop bracket 27 in relation to the index scale 32.

After having completed one operation, in order to start the machine again it is only necessary to press against the outside rim of the former wheel 16 so as to slide the shaft 5 and its corresponding parts slightly to the left, whereupon the former series of operations will occur.

What I claim is:—

1. A wire winding machine comprising a main drive shaft capable of slight longitudinal movement, a driving sleeve loosely carried thereon and provided with a clutch member, a form wheel adapted to have coils of wire wound thereon, non-rotatably carried on said shaft, a fixed clutch member pinned to said shaft adapted to coöperate with said sleeve clutch member, and automatic means for stopping said form wheel by causing sufficient longitudinal movement of the driven shaft to effect a disengagement of the clutch members after a predetermined number of coils have been wound on said form wheel.

2. A wire winding machine comprising a main driven shaft capable of slight longitudinal displacement and having a driving sleeve loosely carried near one end and a form wheel adapted to have coils of wire wound thereon, non-rotatably carried at the other end, a clutch member formed integral with said driving sleeve, a second coöperating clutch member pinned to said shaft, and means capable of accurate adjustment for automatically moving said shaft longitudinally to disengage the coöperating clutch members and stop the former wheel after a predetermined number of coils of wire have been wound thereon.

In testimony whereof I affix my signature in presence of two witnesses.

FERDINAND FRANCIS BRUCKER.

Witnesses:
HARRY G. ARTHUR,
LLOYD H. HALL.

Copies of this patent may be obtained for five cents each, by addressing the "Commissioner of Patents, Washington, D. C."